Feb. 18, 1969 A. D. BERRY 3,428,826
HIGH AND LOW VOLTAGE LEVEL THRESHOLD CIRCUIT EMPLOYING TWO DIFFERENTIAL AMPLIFIER COMPARATORS
Filed July 1, 1965
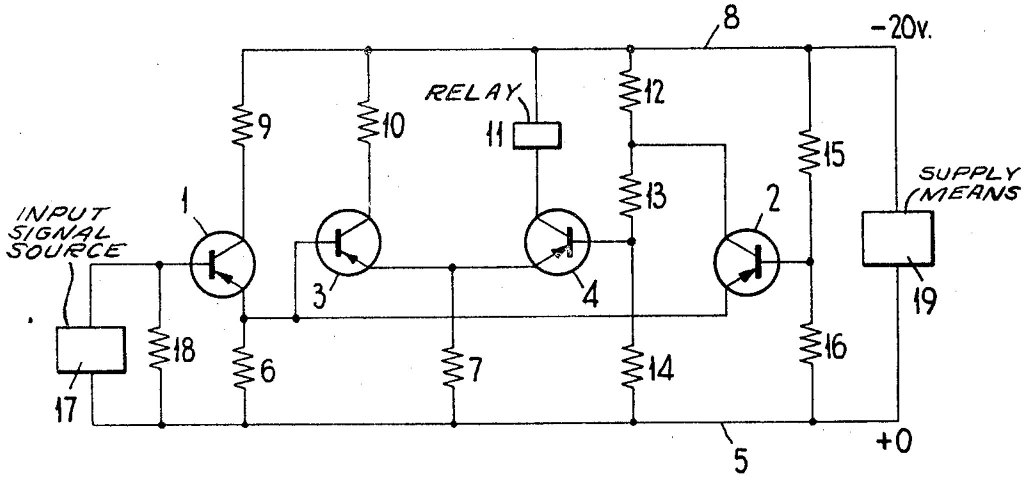
INVENTOR
ALLAN DAVID BERRY
BY Kurtz, Kurtz and Ottinger
ATTORNEYS

1

3,428,826

HIGH AND LOW VOLTAGE LEVEL THRESHOLD CIRCUIT EMPLOYING TWO DIFFERENTIAL AMPLIFIER COMPARATORS

Allan David Berry, Coventry, England, assignor to The General Electric Company Limited, London, England Filed July 1, 1965, Ser. No. 468,740
Claims priority, application Great Britain, July 3, 1964, 27,551/64
U.S. Cl. 307—235 4 Claims
Int. Cl. H03k 5/20

ABSTRACT OF THE DISCLOSURE

A high and low voltage level threshold circuit comprising first and second emitter-coupled pairs of transistors, the first pair being connected to compare an input voltage with a constant reference voltage and the second pair being connected to compare the voltage at the emitter electrodes of the first pair with a voltage derived from the collector circuit of one transistor of the first pair. The output of the circuit is derived from an electromagnetic relay connected in the collector circuit of one of the second pair of transistors.

This invention relates to electric circuit arrangements employing transistors.

More particularly this invention relates to electric circuit arrangements employing transistors, that are responsive to whether the level of an input signal which is supplied thereto is or is not within a predetermined range of values.

It is often necessary in electrical apparatus to provide an alarm by means of an indicator, for example a relay, if the level of an input signal increases or decreases by more than a desired amount from its normal value.

The relay may be arranged in either of two ways. It may be arranged such that if the level of the input signal is between two predetermined values, corresponding to low and high alarm points, the relay is energised, but if the level of the input signal is not between these two values the relay is inert, or it may be arranged such that the relay is inert if the input signal is between the two stated values and energised if it is not. The first of these arrangements is a "fail safe" arrangement, that is if the supply voltage to the relay fails the relay would indicate an alarm condition, and the second of these arrangements is a "fail dangerous" arrangement, that is if the supply voltage to the relay fails the relay would indicate a normal condition regardless of the level of the input signal.

In practice, due to residual magnetism in the relay, the state of the relay when the level of the input signal is at either the two predetermined values depends upon whether the level of the input signal has risen or fallen to that value, i.e., in a "fail safe" arrangement if the level of the input signal has risen to the lower value or fallen to the higher value the relay is inert at these values, but if it has fallen to the lower value or risen to the higher value the relay is energised at these values. In a "fail dangerous" arrangement the state of the relay at the two predetermined values would be opposite to that stated above for the conditions stated above.

This effect of the residual magnetism in the relay is useful in that it prevents the relay "chattering" in the event of the level of the input signal being at either of the two predetermined values.

Known circuit arrangements designed to provide the above described alarm indications suffer from a number

2 of disadvantages some of which are as follows. If the level of the input signal increases to a value which is much greater than that of the higher value the relay may become wrongly energised, giving, in a "fail safe" arrangement, a wrong indication, and further, the variations in the level of the input signal may cause unduly large variations in the current in the relay and/or in the current drawn from the supply, both of which effects are undesirable. A further disadvantage of known circuits is that if they have a low input impedance compared with the source impedance of the input signal, this causes the predetermined values to be too dependent upon the circuit component characteristics.

An object of the present invention is to provide an electric circuit arrangement of the type specified which overcomes to a substantial degree the above stated disadvantages.

A further object of the present invention is to provide an electric circuit arrangement of the type specified utilising a small number of components, especially semiconductor devices, and which requires only a small supply of current for operation.

According to the present invention an electric circuit arrangement that is responsive to the level of an input signal comprises a pair of input terminals, first, second, third and fourth transistors each having a control electrode and first and second further electrodes, the first and second transistors being connected with a resistive element in a common circuit of the first further electrodes of both transistors to form a first comparison circuit, and the third and fourth transistors being connected with a resistive element in a common circuit of the first further electrodes of both transistors to form a second comparison circuit, means to supply to the control electrode of one of the transistors of the second comparison circuit a potential that is dependent upon the potential across said resistive element of the first comparison circuit, means to supply to the control electrode of the other transistor of the second comparison circuit a potential that is dependent upon the current flowing through the path between the first and second further electrodes of one of the transistors of the first comparison circuit, means to supply a potential to the control electrode of one transistor of the first comparison circuit that is dependent upon the level of the input signal supplied to the input terminals and means to supply a bias potential to the control electrode of the other transistor of the first comparison circuit, and means responsive to the flow of current through one of the transistors of the second comparison circuit, the arrangement being such that the last mentioned means only responds when the level of the input signal lies within a predetermined range of values.

One "fail safe" circuit arrangement in accordance with the present invention will now be described by way of example with reference to the accompanying drawing which shows the circuit.

It is assumed that the signal in the level of which the interest lies may readily be converted to a unidirectional voltage of suitable magnitude, if it is not already in that form, and this unidirectional voltage will hereafter be referred to as the input signal voltage.

Referring now to the drawing the circuit includes four p-n-p junction transistors 1, 2, 3 and 4. The emitter electrodes of the transistors 1 and 2 are directly connected together and to a positive supply line 5 by way of a resistor 6. The emitter electrodes of the transistors 3 and 4 are directly connected together and to the line 5 by way of a resistor 7. The collector electrode of the transistor 1 is connected to a negative supply line 8 by way of a resistor 9, and the collector electrode of the transistor 3 is connected to the line 8 by way of a resistor 10. The collector electrode of the transistor 4 is connected to the line 8 by way of the operating winding, of a relay 11, and the collector electrode of the transistor 2 is connected to the junction between resistors 12 and 13 which together with the resistor 14 form a potential divider chain between the lines 5 and 8. The base electrode of the transistor 2 is connected to the junction between resistors 15 and 16 which form another potential divider chain between the lines 5 and 8. The base electrode of the transistor 4 is connected to the junction between the resistors 13 and 14, and the base electrode of the transistor 3 is connected to the emitter electrode of the transistor 1.

The input signal voltage from a source 17 is applied between the base electrode of the transistor 1 and the supply line 5 across a resistor 18 and is of such polarity as to make the base electrode of the transistor 1 negative with repect to the supply line 5. The line 8 is maintained at a potential of —20 volts with respect to the line 5 by supply means 19.

The operation of the circuit is as follows:

The transistors 1 and 2 function as a comparison circuit which operates to compare the magnitude of the input signal voltage with a reference potential from the junction between the resistors 15 and 16, and the transistors 3 and 4 junction as a further comparison circuit which operates to compare the potential at the emitter electrode of the transistor 1 with a potential from the junction between the resistors 13 and 14.

The values of the resistors 6, 7, 12, 13, 14, 15 and 16 are chosen such that the biases which are applied to the transistors 1, 2, 3 and 4 are such that when the magnitude of the input signal voltage is below the required low alarm point the transistor 1 is nonconducting, the transistor 2 is conducting, the collector current of the transistor 2 acting to render the transistor 4 nonconducting, and the transistor 3 is conducting.

As the transistor 4 is nonconducting, no current is supplied to the relay 11 and it is inert.

If the magnitude of the input signal voltage rises to above the required low alarm point the transistor 1 becomes conducting the transistor 2 thus becoming nonconducting, and thereby increases the bias applied to the base electrode of transistor 4. Provided that the magnitude of the input signal voltage is between the required low and high alarm points the bias applied to the base electrode of the transistor 3 is less than that now applied to the base electrode of the transistor 4, and thus the transistor 3 is nonconducting whilst the transistor 4 is conducting. Thus current is supplied to the relay 11 and is energised.

If the magnitude of the input signal voltage rises above the required high alarm point the bias applied to the base electrode of the transistor 3 exceeds that applied to the base electrode of the transistor 4, and the transistor 3 becomes conducting whilst the transistor 4 becomes nonconducting. Thus no current is supplied to the relay and it becomes inert.

The values of the resistors 9 and 10 are chosen such that when the magnitude of the input signal voltage is above the required high alarm point the transistors 1 and 3 are bottomed, thus limiting the total current which is drawn from the line 5.

The three conditions of the circuit are thus as follows:

If the magnitude of the input signal voltage is between the low and high alarm points, the transistors 1 and 4 are conducting, the transistors 2 and 3 are nonconducting, and the relay 11 is energised. If the magnitude of the input signal voltage is below the low alarm point the transistors 2 and 3 are conducting, the transistors 1 and

4 are nonconducting, and the relay 11 is inert, and if the magnitude of the input signal voltage is above the high alarm point the transistors 1 and 3 are conducting, the transistors 2 and 4 are nonconducting, and the relay 11 is inert.

If the potential supply to the lines 5 and 8 should fail, the relay 11 becomes inert thus indicating an alarm condition, the arrangement being therefore "fail safe."

I claim:

1. An electric circuit arrangement that is responsive to the level of an input signal comprises a pair of input terminals, first, second, third and fourth transistors each having a control electrode and first and second further electrodes, the first and second transistors being connected with a resistive element in a common circuit of the first further electrodes of both transistors to form a first comparison circuit, and the third and fourth transistor being connected with a resistive element in a common circuit of the first further electrode of both transistors to form a second comparison circuit, means to supply to the control electrode of one of the transistors of the second comparison circuit a potential that is dependent upon the potential across said resistive element of the first comparison circuit, means to supply to the control electrode of the other transistor of the second comparison circuit a potential that is dependent upon the current flowing through the path between the first and second further electrodes of one of the transistors of the first comparison circuit, means to supply a potential to the control electrode of one transistor of the first comparison circuit that is dependent upon the level of the input signal supplied to the input terminals and means to supply a bias potential to the control electrode of the other transistor of the first comparison circuit, and means responsive to the flow of current through one of the transistors of the second comparison circuit, the arrangement being such that the last mentioned means only responds when the level of the input signal lies within a predetermined range of values.

2. An electric circuit arrangement that is responsive to the level of an input signal comprising a pair of supply lines, means to maintain a unidirectional potential difference between said supply lines, a first pair of transistors, a second pair of transistors, each of said transistors having a control electrode and first and second further electrodes, means connecting the first further electrodes of said first pair of transistors together and by way of a first resistive element to one of said supply lines, means connecting the first further electrodes of said second pair of transistors together and by way of a second resistive element to one of said supply lines, means connecting the control electrode of one of said second pair of transistors to the interconnected first further electrodes of said first pair of transistors, means connecting the control electrode of the other of said second pair of transistors to the second further electrode of one of said first pair of transistors, means to apply a bias potential to the control electrode of one of said first pair transistors, means to apply an input signal voltage between the control electrode of the other of said first pair of transistors and one of said supply lines, and means responsive to current flow through one of said second pair of transistors, the arrangement being such that the last-mentioned means only responds when the level of the input signal lies within a predetermined range of values.

3. An electric circuit arrangement in accordance with claim 1 wherein said transistors are junction transistors, and said control electrodes are base electrodes and said first and second further electrodes are respectively emitter and collector electrodes.

4. An electric circuit arrangement in accordance with claim 3 wherein said means responsive to current flow comprises an electromagnetic relay an operating winding of which is connected in series with the emitter-collector path of the respective transistor.

References Cited

UNITED STATES PATENTS

| | | | |
|---|---|---|---|
| 2,829,940 | 6/1959 | Ogletree | 328—146 |
| 3,077,566 | 2/1963 | Vosteen | 330—30 |
| 3,168,709 | 2/1965 | Sikorra | 330—30 |
| 3,178,698 | 4/1965 | Graham | 307—235 X |
| 3,316,423 | 4/1967 | Hull | 328—148 X |

JOHN N. HEYMAN, *Primary Examiner.*

U.S. Cl. X.R.

307—230